United States Patent [19]
Kobayashi

[11] Patent Number: 5,706,910
[45] Date of Patent: Jan. 13, 1998

[54] POWER SOURCE SWITCHING SYSTEM FOR ELECTRIC MOTOR VEHICLES

[75] Inventor: Yuukichi Kobayashi, Tokyo, Japan

[73] Assignee: Mitsubishi Chemical Corporation, Tokyo, Japan

[21] Appl. No.: 649,937

[22] Filed: May 15, 1996

[51] Int. Cl.⁶ .................................................. B60K 28/10
[52] U.S. Cl. ......................... 180/279; 180/274; 180/65.1
[58] Field of Search ................................. 180/274, 279, 180/275, 276, 277, 65.1, 165; 340/436, 438

[56] References Cited

U.S. PATENT DOCUMENTS 5,238,083  8/1993  Horie et al. ............................. 180/274
5,565,711  10/1996  Hagiwara ............................. 307/10.1

Primary Examiner—Brian L. Johnson
Assistant Examiner—Johnathan E. Butts
Attorney, Agent, or Firm—McAulay Fisher Nissen Goldberg & Kiel, LLP

[57] ABSTRACT

A power source switching system for electric motor vehicles comprises a plurality of secondary cell units as a power source, one or more discriminating sensors for detecting vehicle information, a control device for accepting a signal from the sensors and a switching circuit for switching the connection state of the plurality of secondary cell units, responsive to a control signal issued by the control device. In one embodiment of the invention, the discriminating sensor detects the occurrence of an impact shock, with the switching circuit changing the connection state of the plurality of secondary cell units into a parallel connection to prevent short circuiting. In another embodiment of the invention, the discriminating sensor detects whether the vehicle is operating in a running mode, an inertia running mode or a regenerative braking mode respectively, with the switching circuit changing the connection state of the plurality of secondary cell units from a serial connection to a parallel connection or from a parallel connection to a serial connection in accordance with the control signal generated by detecting the operating mode, to prevent overcharging cycles which are detrimental to cell life.

14 Claims, 4 Drawing Sheets

POWER SOURCE SWITCHING SYSTEM FOR ELECTRIC MOTOR VEHICLES

BACKGROUND OF THE INVENTION

The present invention relates to a power source switching system for electric motor vehicles, and more specifically, it relates to a power source switching system for electric motor vehicles for preventing a short-circuit accident of electric cells caused by abrupt impact shocks, for example, by an accidental collision. The power source switching system is also used for charging lithium cells by connecting a plurality of secondary lithium cell units in parallel during an inertia running mode or regenerative braking mode.

Electric motor vehicles having electric cells as a driving power source are known. In the electric motor vehicles, an electric motor is driven by connecting secondary cells in series or parallel. On the other hand, the secondary cells are charged by a charger while the secondary cells are connected in parallel or in series in accordance with a vehicle speed (refer to Japanese Patent Application Laid-Open (KOKAI) No. 3-203501).

Since the electric motor vehicle runs by electric power of high voltage/large capacity (for example, 300 V; 65 A) obtained by connecting the secondary cells in series, if abrupt impact shocks occur, for example, upon collision, there is a high possibility that the electric cells may be short-circuited causing high temperature heating which may possibly cause a fire leading to accidental injury or death.

In the prior charging system, the parallel or serial power source system is charged in accordance with the vehicle speed. However the above-mentioned power source has a significant problem in that secondary lithium cells are sensitive to overcharging. That is, the secondary lithium cells suffer from significant deterioration using the prior charging system and such lithium cells cannot be used practically. Particularly, for effective utilization of energy, when a vehicle is slowed by a brake or the like (regenerative braking state), the energy of inertial running is recovered as electric power, such that the secondary lithium cells undergo a high charging rate. Since the acceleration and deceleration are repeated frequently, the secondary lithium cells suffer from further increased damages through this cyclic overcharging.

As a result of a study by the present inventor, it has been found that the generation of high temperature heat caused by short-circuit current upon undergoing an impact shock in electric motor vehicles can be prevented by switching a plurality of secondary cell units into parallel connection. It has also been found that the deterioration of lithium cells caused by overcharging during inertia running or regenerative braking can be prevented by switching a plurality of secondary cell units into parallel connection. The present invention has been accomplished on the basis of these findings.

SUMMARY OF THE INVENTION

An object of the present invention is to provide a power source switching system for electric motor vehicles, which, upon occurrence of an impact shock, is capable of automatically switching an electric circuit into a parallel connection, thereby preventing the generation of high temperature heat caused by short-circuiting.

Another object of the present invention is to provide a power source switching system for electric motor vehicles, capable of preventing degradation of secondary lithium cells during charging and capable of conducting charging in a way which extends the working life of the cells.

To accomplish these objects, in a first aspect of the present invention, there is provided a power source switching system for an electric motor vehicle, comprising:

a plurality of secondary cell units as a power source for the electric motor vehicle;

discriminating means for detecting information;

a control device for accepting a signal from the discriminating means;

a switching circuit for switching the connection state of the plurality of secondary cell units responsive to a control signal from the control device; and a motor and a generator connected by means of the switching circuit with the plurality of secondary cell units respectively, wherein the discriminating means comprise means for detecting the occurrence of an impact shock and wherein the switching circuit changes the connection state of the plurality of secondary cell units into a parallel connection in response to the control signal generated by the detection of the impact shock.

The discriminating means may alternatively or additionally comprise means for detecting each of a running mode, an inertia running mode and a regenerative braking mode respectively, and wherein the switching circuit changes the connection state of the plurality of secondary lithium cell units from serial connection to parallel connection or from parallel connection to serial connection in accordance with the control signal generated by detecting the mode.

With such a system, the plurality of secondary lithium cell units being charged change their connection state into a parallel connection during the inertia running mode or regenerative braking mode.

In a second aspect of the present invention, there is provided a power source switching system for electric motor vehicles, comprising a plurality of secondary cell units as a power source for electric motor vehicles, a discriminating means for detecting the occurrence of an impact shock accident, a control device for accepting a signal from the discriminating means, and a switching circuit for changing the connection state of the plurality of secondary cell units by the control signal from the control device, such that upon detecting the occurrence of the impact shock, the switching circuit changes the connection state of the plurality of secondary cell units to a parallel connection.

In a third aspect of the present invention, there is provided a power source switching system for electric motor vehicles, comprising a plurality of secondary cell units as a power source for electric motor vehicles, a discriminating means for detecting a running mode, an inertia running mode and a regenerative braking mode respectively, a control device for accepting a signal from the discriminating means, a switching circuit for changing the connection state of the plurality of secondary lithium cell units from serial connection into parallel connection or from parallel connection into serial connection, based on the control signal from the control device, a motor and a generator connected by means of the switching circuit with the plurality of secondary lithium cell units respectively.

The secondary lithium cells are charged by changing the connection state of the plurality of secondary lithium cell units into parallel connection upon the inertia running mode or regenerative braking mode.

DETAILED DESCRIPTION OF THE INVENTION

In an electric motor vehicle to which the power source switching system according to the present invention is applied, a secondary cell unit such as a secondary lithium cell unit is used, for example, as a power source. The secondary lithium cell comprises, for example, a composite metal oxide composed of Li ion, a specific metal as a positive electrode active material, a carbonaceous material as a negative electrode active material, in which a diaphragm is disposed between the positive electrode and the negative electrode to form a lamination electrode, and an organic aprotic solvent in which a Li salt is dissolved and used as an electrolyte. As the composite metal oxide, $LiCoO_2$, $LiNiO_2$, $LiMnO_2$, $LiFeO_2$ and the like are used. For the carbonaceous material, needle cokes, pitch cokes, graphite and the like are used. As the Li salt, $LiBF_4$, $LiClO_4$ and the like are used. As the organic aprotic solvent, propylene carbonate, dimethyl sulfoxide, 3-methyl-1,3-oxazolidin-2-on, sulfolane, 1,2-dimethoxyethane, 2-methyl tetrahydrofuran and the like are used.

Each of the electrodes is produced by blending each of the electrode ingredients (composite metal oxide and carbonaceous material) in a solution of a binder and a polar solvent at a high concentration to prepare an electrode material and then coating the electrode material on the surface of a collector, and drying and sintering the same. Polyvinylidene fluoride or the like is used as a binder and N-methyl pyrrolidone or the like is used as the polar solvent. The drying and sintering are usually conducted at a temperature from 300° to 400° C.

Figure 4:
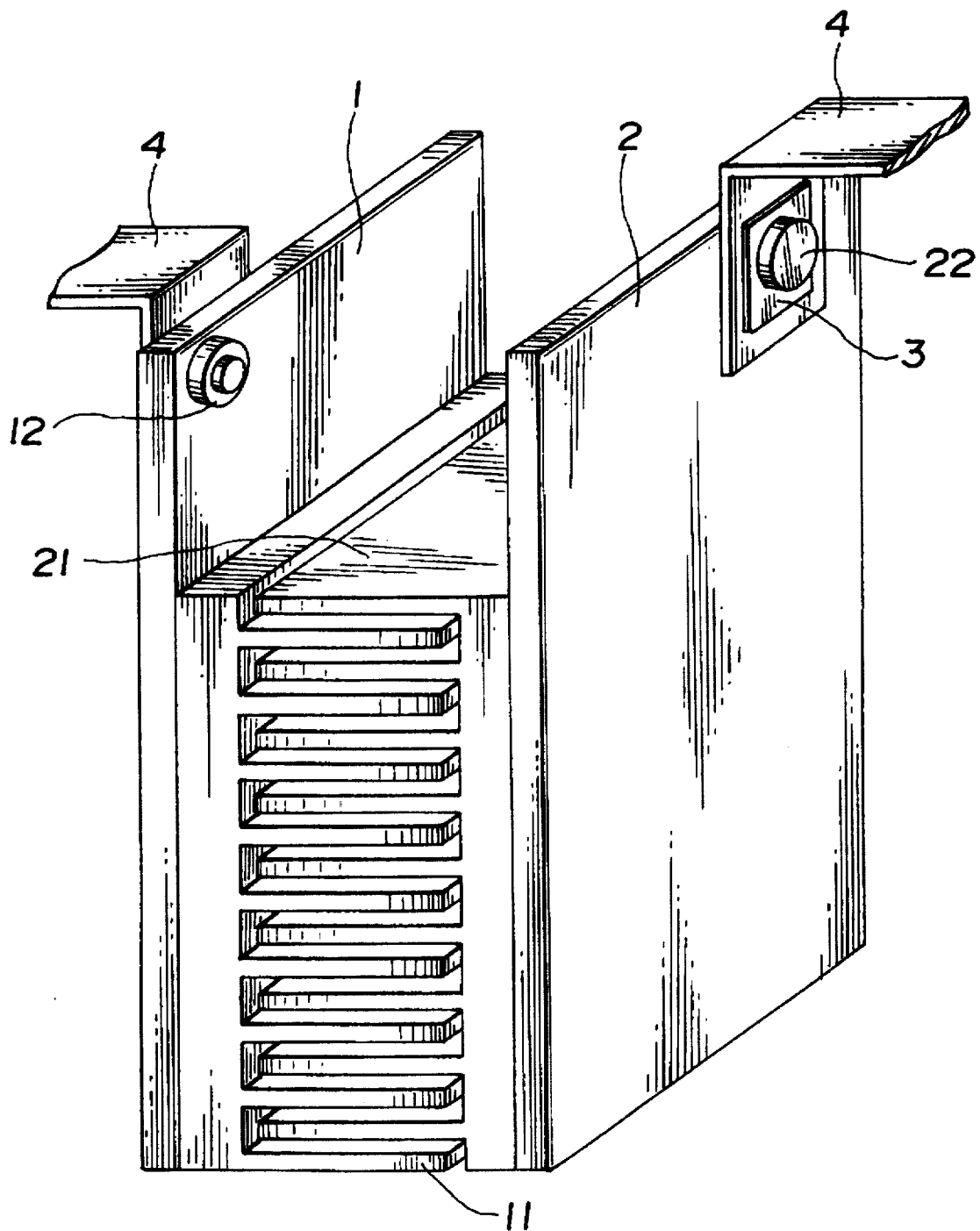
FIG. 4 is an explanatory view for one example of a secondary lithium cell.
Figure 5:
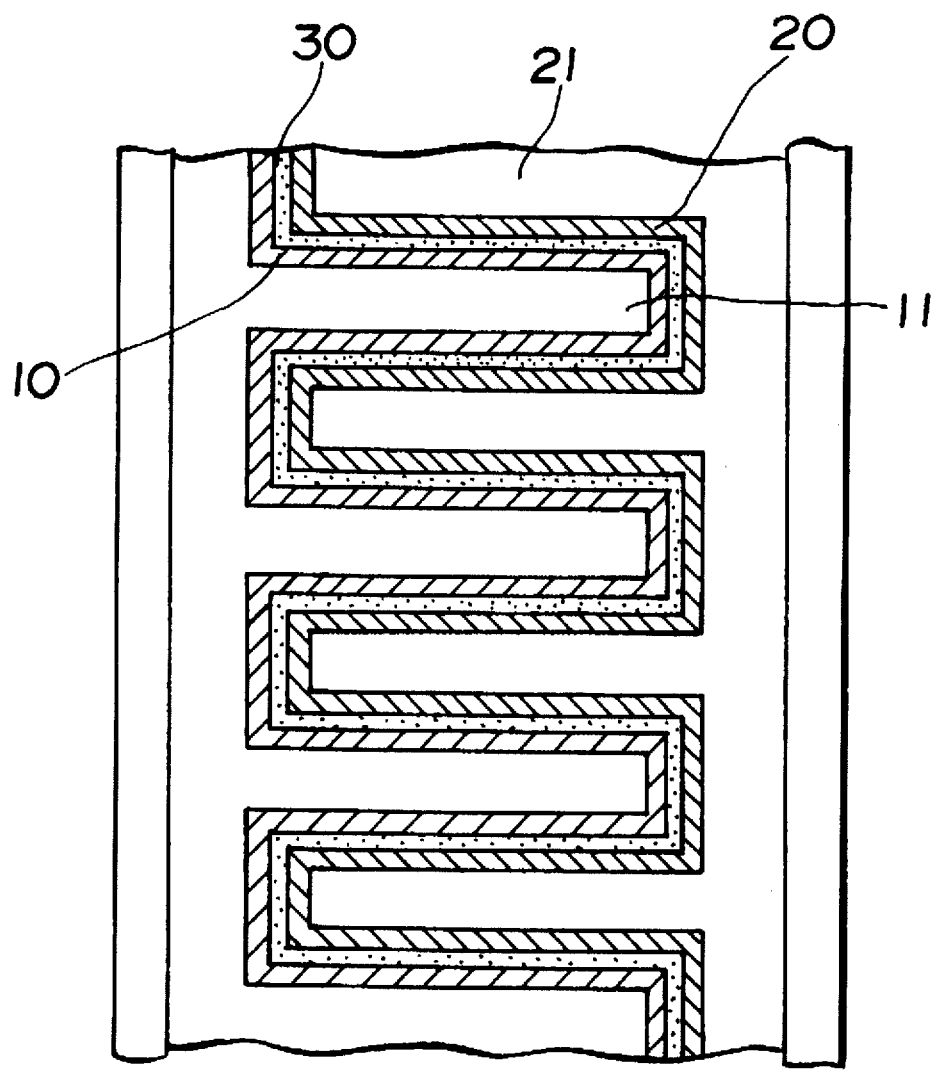
FIG. 5 is an explanatory view for a main portion of the secondary lithium cell shown in FIG. 4.

For the structure of the collector (electrode), a comblike structure as shown in FIG. 4 and FIG. 5, as well as any other optional structure may be adopted. The collector shown in FIG. 4 (the coating layer for each of the electrodes is not shown) has a structure in which a positive electrode collector (1) having a comb-shaped portion (11) and a negative electrode collector (2) having a comb-shaped portion (21) are arranged such that the comb-like shaped portions fit to each other. Then, each of the lead plates (4) for the positive electrode and the negative electrode is clamped by a bolt by means of a vibration damping washer (3) to each of terminals (12) and (22) disposed at the end of each collector expending from the back of each of the comb-shaped portions. In FIG. 5 are shown a positive electrode coating layer (10), a negative electrode coating layer (11) and a diaphragm (12).

Figure 1:
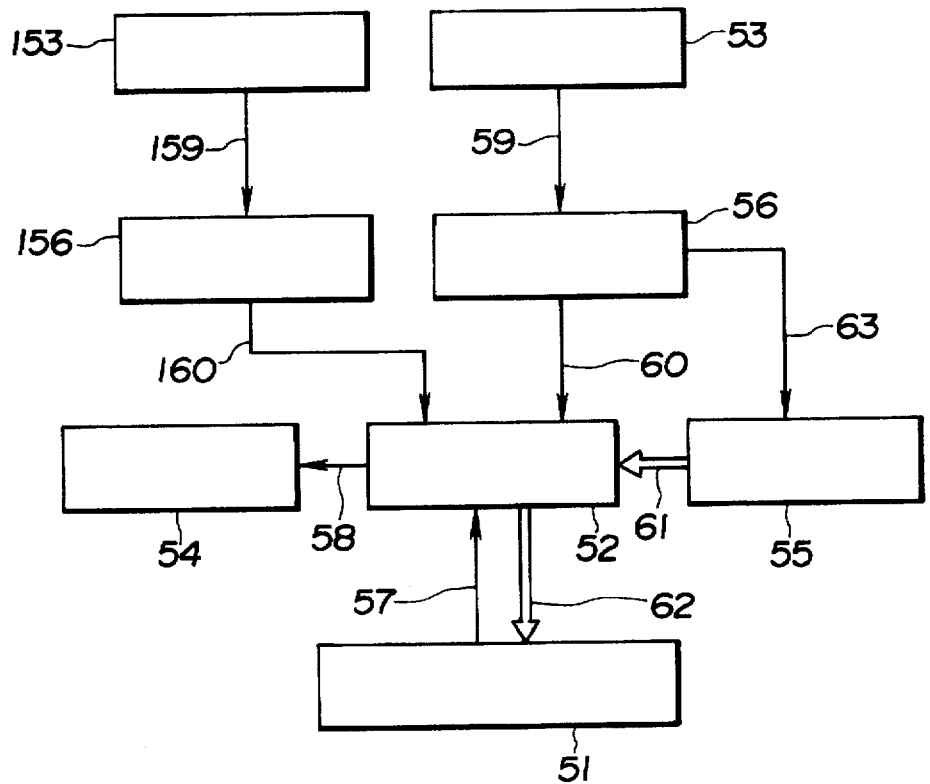
FIG. 1 is an explanatory view illustrating an embodiment of a power source switching system for electric motor vehicles according to the present invention.

A power source switching system for electric motor vehicles according to the present invention comprises, as shown in FIG. 1, a plurality of secondary lithium cell units (51) as a power source for the electric motor vehicle; a discriminating means (153) for detecting the occurrence of impact shock, a discriminating means (53) for detecting a running mode, an inertia running mode and a regenerative braking mode, respectively; a switching circuit (52) for switching the connection state of the plurality of secondary lithium cell units into a parallel connection in accordance with the impact shock information signal supplied by the discriminating means (153). The connection state of the plurality of secondary lithium cell units can switch from serial connection into parallel connection or from parallel connection into serial connection in accordance with the information signal from the discriminating means (53). A motor (54) and a generator (55) are connected by means of the switching circuit with the plurality of secondary lithium cell units.

During usual driving of the electric motor vehicle (during running mode), the secondary lithium cell units (51) are connected in series. That is, an output from the discriminating means (53) is sent by means of a signal line (59) into the control device (56), and the switching circuit (52) is connected in series by the control signal (60) based on the output. For example, by connecting 75 unit cells (voltage of a unit cell=4 V) in series, the motor (54) is driven with a high voltage/high capacity of 300 V/65 A. In the drawing, arrows (57) and (58) show the flow of the discharging current.

When the electric motor vehicle undergoes an impact shock, the discriminating means (153) senses the impact shock, being an impact shock detection sensor. The signal from the sensor is sent by means of a signal line (159) to a control device (156) and then the switching circuit (52) is connected in parallel by a control signal (160) based on the output. As a result, the electric flow at high voltage/large capacity from the secondary lithium cell unit (51) is interrupted.

The impact detection sensors comprising the discriminating means (153) are disposed so as to contact with bumpers in front of and at the back of the electric motor vehicle. Further, for improving the performance of the discriminating means (153), a shock detection sensor can be disposed also to the outside of a battery casing. Then, it is possible for the sensors to detect impact shocks such as forward and backward impact shocks and shocks caused by rolling down of the electric motor vehicle, thereby enabling the automatic switching of the connection system of the secondary lithium cell units (51) into the parallel connection system.

In a case of charging lithium cells during inertia running mode or regenerative braking mode, the secondary lithium cell units (51) are connected in parallel. That is, an output from the discriminating means (53) is sent by means of the signal line (59) into the control device (56) and the switching circuit (52) is connected in parallel by the control signal (60) based on the output, and the secondary lithium cell units (51) are charged by the generator (55) based on the signal (63) from the control device (56). In the figure, arrows (61) and (62) show the flows of charging current.

Figure 2:
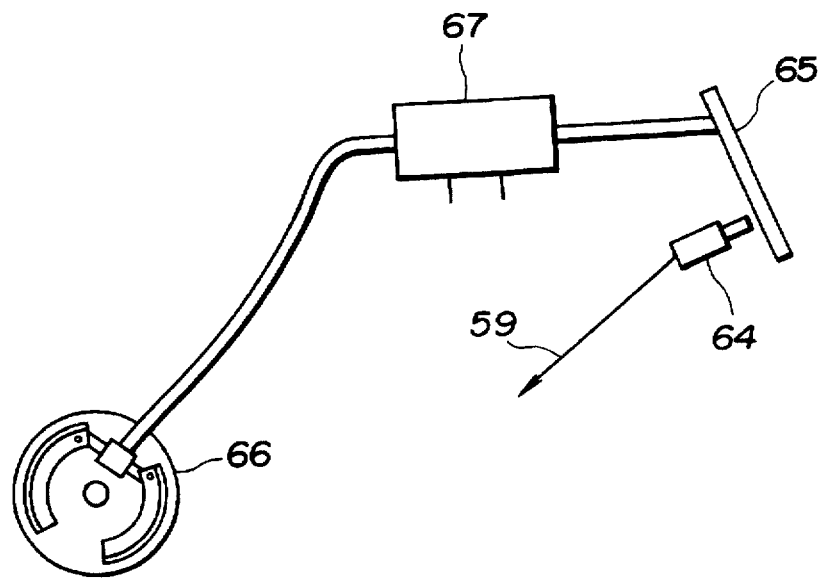
FIG. 2 is an explanatory view illustrating one example of a braking sensor.

The discrimination for the running mode, the inertia running mode and the regenerative braking mode by the discriminating means (53) is conducted by an acceleration sensor and a brake sensor. Description is to be made by an example in which the discriminating means (53) is a brake sensor with reference to FIG. 2. The braking is conducted by pushing a brake pedal (65) for feeding fluid from a master cylinder (67) to a rotational drum (66). When the brake pedal (65) is pushed, a brake sensor (64) disposed so as to contact with the brake pedal (65) is actuated, and a discriminating signal is generated and sent by means of the signal line (59) to the control device (56) shown in FIG. 1. Based on this signal, the switching circuit (52) changes the connection state into parallel.

The embodiment in which the discriminating means (53) is an acceleration sensor is the same as described above although not illustrated. That is, an acceleration sensor is disposed so as to contact with the acceleration pedal for detecting whether a driver's foot releases the acceleration pedal or not. Then, when the foot releases the acceleration pedal, the acceleration sensor generates a discriminating signal and the switching circuit is connected in parallel based on the signal sent by means of the signal line to the control device.

Figure 3A:
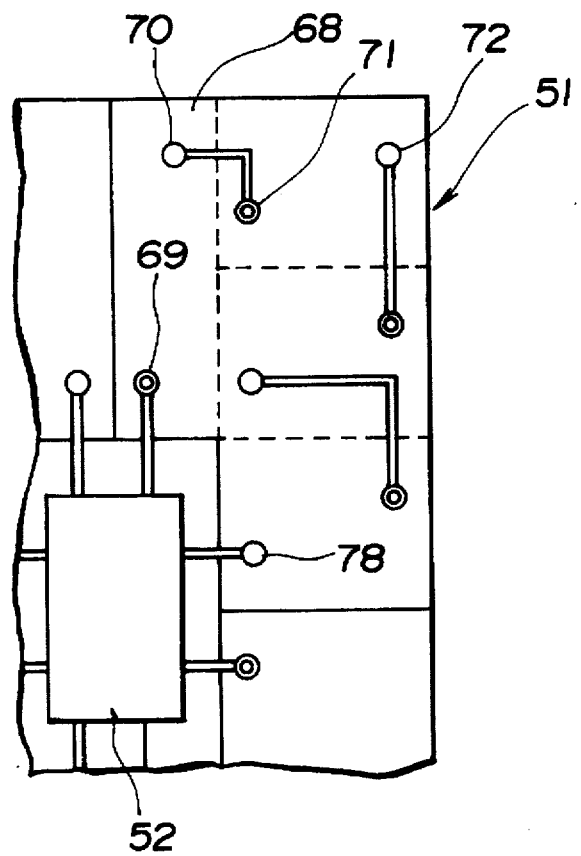
FIG. 3(a) and FIG. 3(b) are explanatory views illustrating an example of parallel and serial connection modes for secondary lithium cell units.
Figure 3B:
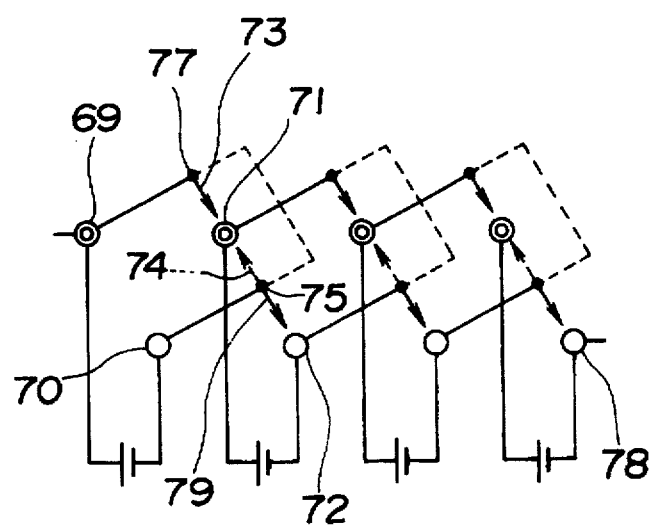

The parallel and serial connections of the secondary lithium cell units (51) is explained with reference to FIG. 3(a) and FIG. 3(b). The secondary lithium cell unit (51) has a plurality of secondary lithium cells (68) for obtaining a desired voltage.

When the motor-operated vehicle undergoes an impact shock, a contact (77) is connected with a negative electrode (71) by a changing switch as shown by an arrow (73), and a contact (75) is connected with a positive electrode (72) by the changing switch as shown by an arrow (79) by the signal from the control device (156). Other cells in the secondary lithium cell unit (51) are also connected in the same way and each of the cells is finally connected in parallel between the negative electrode and the positive electrode. Further, each of the units is also connected in parallel.

In a case of charging the lithium cells during the inertia running mode or regenerative braking mode. When positive electrodes (70), (72), (78) and negative electrode (69), (71) for each of the cells are connected in series by a serial connection signal from the control device (56) shown in FIG. 1, the contact (75) is connected with the negative electrode (71) by a changing switch as shown by an arrow (74). Other cells in the secondary lithium cell unit (51) are also connected in the same manner and each of the cells is finally connected in series between the negative electrode and the positive electrode, and further, each of the units is also connected in series.

On the other hand, when the positive electrodes (70), (78) and the negative electrodes (69), (71) are connected in parallel by a parallel connection signal from the control device (56) shown in FIG. 1, the contact (77) is connected to the negative electrode (71) by a changing switch as shown by the arrow (73), and the contact (75) is connected to the positive electrode (72) by the changing switch as shown by the arrow (79). Other cells in the secondary lithium cell unit (51) are also connected in the same manner, each of the electrodes is finally connected in parallel between the negative electrode and the positive electrode, and further, each of the units is also connected in parallel.

During the running mode, all the cells in each of the secondary lithium cell units (51) are connected in series, and further, all the secondary lithium cell units (51) are connected in series by the connection method as described above, and electric power of high voltage/large capacity is supplied to a motor (54) shown in FIG. 1. During the inertia running mode or regenerative braking mode, all the cells in each of the secondary lithium cell units (51) are connected in parallel, and further, all the secondary lithium cell units (51) are connected in parallel to prevent degradation of the cells during charging.

According to the present invention, the generation of high temperature heat caused by short-circuiting can be prevented upon occurrence of an accident by switching the connection system for the secondary cells into a parallel connection instantaneously and automatically. In addition, since the voltage can be controlled by the parallel connection to such a level free from the danger of a fire caused by an electric short circuit, it is possible to move the electric motor vehicle at a low speed to a safe place.

Further, the present invention can provide an advantageous effect of preventing degradation of the secondary lithium cells during charging in the inertia running mode or regenerative braking mode and of conducting electric charging relatively satisfactorily, thereby extending the working life of the cells, that is, extending the working life of the electric motor vehicle as long as possible.

What is claimed is:

1. A power source switching system for an electric motor vehicle comprising:
   a plurality of cell units as a power source for the electric motor vehicle;
   discriminating means for detecting the occurrence of an accident or impact shock;
   a control device for accepting a signal from the discriminating means;
   a switching circuit for switching the connection state of the plurality of cell units responsive to a control signal from the control device, so as to change the connection state of the plurality of cell units from a serial connection into a parallel connection.

2. The power source switching system of claim 1, wherein the discriminating means are impact detection sensors disposed adjacent to a front and back of the electric motor vehicle.

3. The power source switching system of claim 1 wherein the discriminating means is a shock detection sensor disposed adjacent the plurality of cell units.

4. A power source switching system for an electric motor vehicle comprising:
   a plurality of cell units as a power source for the electric motor vehicle,
   discriminating means for detecting an operating mode of the vehicle, the operating mode being a running mode, an inertia running mode, and a regenerative braking mode respectively;
   a control device for accepting a signal from the discriminating means;
   a switching circuit for switching the connection state of the plurality of cell units in response to a control signal from the control device;
   a motor and a generator connected by means of the switching circuit with the plurality of cell units respectively, for charging the cell units,
   the switching circuit changing the connection state of the plurality of cell units from a serial connection to a parallel connection or from a parallel connection to a serial connection in accordance with the detected operating mode of the electric vehicle, such that the plurality of cell units are changed in their connection state from a serial connection into the parallel connection during the inertia running mode or regenerative braking mode, and from the parallel connection to the serial connection during the running mode.

5. The power source switching system of claim 4 wherein the discriminating means comprise a brake sensor for detecting the regenerative braking mode, the brake sensor detecting when a brake system is actuated to slow the vehicle thereby sending a signal to the control device to cause the switching circuit to change the connection state from a serial connection to a parallel connection.

6. The power source switching system of claim 4 wherein the discriminating means comprise an acceleration sensor for detecting the inertial running mode, the acceleration sensor detecting deceleration through release of an acceleration pedal, thereby sending a signal to the control device to cause the switching circuit to change the connection state from a serial connection to a parallel connection.

7. The power source switching system of claim 4 wherein the cell units are lithium cell units.

8. A power source switching system for an electric motor vehicle comprising:

a plurality of cell units as a power source, first discriminating means for detecting impact shocks or accidents and second discriminating means for detecting a vehicle operating mode, a control device for accepting a signal from the first and second discriminating means, a switching circuit for switching the connection state of the plurality of cell units responsive to a control signal from the control device, such that when the first discriminating means detects the occurrence of an impact or accident, the switching circuit changes a connection state of the plurality of cell units into a parallel connection and such that when the discriminating means detects an inertial mode or a regenerative braking mode, the switching circuit changes the connection state of the plurality of cell units from a serial connection to a parallel connection and such that when the second discriminating means detects a running mode, the plurality of cell units are switched to a serial connection.

9. The power source switching system of claim 8 further comprising a motor and generator for charging the cell units, connected through the switching circuit to the plurality of cell units, for charging the cell units during the running mode.

10. The power source switching system of claim 8 wherein the first discriminating means are impact detection sensors disposed adjacent to a front and back of the electric motor vehicle.

11. The power source switching system of claim 8 wherein the first discriminating means is a shock detection sensor disposed adjacent the plurality of cell units.

12. The power source switching system of claim 8 wherein the second discriminating means comprise a brake sensor for detecting the regenerative braking mode, the brake sensor detecting when a brake system is actuated to slow the vehicle thereby sending a signal to the control device to cause the switching circuit to change the connection state from a the serial connection to a the parallel connection.

13. The power source switching system of claim 8 wherein the second discriminating means comprise an acceleration sensor for detecting the inertial running mode, the acceleration sensor detecting deceleration through release of an acceleration pedal, thereby sending a signal to the control device to cause the switching circuit to change the connection state from a serial connection to a parallel connnection.

14. The power source switching system of claim 8 wherein the cell units are lithium cell units.

* * * * *